Feb. 21, 1961   R. M. BARRER ET AL   2,972,516
CRYSTALLINE ZEOLITE Z AND METHOD FOR PREPARING SAME
Filed Feb. 29, 1956

Conditions For Preparation of Zeolite Z

Adsorptive Capacities of Ion-Exchanged Zeolite Z

INVENTORS
RICHARD M. BARRER
JOHN W. BAYNHAM
ATTORNEY

United States Patent Office 2,972,516
Patented Feb. 21, 1961

2,972,516
CRYSTALLINE ZEOLITE Z AND METHOD FOR PREPARING SAME

Richard Maling Barrer, Bromley, England, and John William Baynham, Coupar, Fife, Scotland, assignors to Union Carbide Corporation, a corporation of New York Filed Feb. 29, 1956, Ser. No. 568,652

4 Claims. (Cl. 23—113)

This invention relates to a novel composition of matter and a method for making and using the novel material. More particularly the invention relates to a novel molecular sieve of the zeolite family.

Zeolites are metal-aluminum-silicates and many are found in nature. A number of these materials are known to be useful as ion-exchange agents and as adsorbents.

The crystalline structure of some zeolites, called molecular sieves, is such that a relatively large space exists within the crystal. Adsorbate molecules are retained in these spaces. Access to the spaces is by way of openings in the crystal lattice. These openings limit the size of the molecules that can be adsorbed by the molecular sieves and permit a separation of certain mixtures of molecules on the basis of the size of molecules in the mixture. Other preferences for adsorbates are exhibited by the molecular sieves based on, for example, the polarity of the adsorbate and the degree of unsaturation of organic adsorbates.

A number of zeolitic molecular sieves have been synthesized. These molecular sieves are distinguishable from each other on the basis of either their composition, crystalline structure, adsorptive properties or a combination of these characteristics. The existence of a number of molecular sieves having similar but distinguishable properties permits the selection of an adsorbent having the optimum properties for any given adsorption process.

It is the principal object of the present invention to provide a novel molecular sieve of the zeolite family having useful adsorption and ion-exchange properties.

For convenience the molecular sieve of the invention will be designated "zeolite Z." The ion exchanged forms of zeolite Z will be designated by reference to the exchangeable ion present in the zeolite, for example, "sodium zeolite Z" and "potassium zeolite Z."

The composition of zeolite Z may be expressed in terms of mol ratios of oxides. Thus the formula for potassium zeolite Z is as follows:

$$K_2O:Al_2O_3:2SiO_2:XH_2O$$

In the formula "X" may be any value not exceeding three. A more general formula for zeolite Z in which "M" is an exchangeable cation, "$n$" its valence, and "X" may be any value not exceeding three is as follows:

$$\frac{M_2O}{n}:Al_2O_3:2SiO_2:XH_2O$$

Typical of the manner in which zeolite Z may be prepared is the following:

EXAMPLE I

Potassium hydroxide, aluminum hydroxide and silicic acid containing 15% by weight silica were mixed in water in proportions such that the following ratios prevailed: 1 mol $K_2O$:1 mol $Al_2O_3$:4 mols $SiO_2$. From the gel that was formed from this mixture of materials a dry sample weighing 0.5 gram was prepared. The sample was mixed with 15 milliliters of potassium hydroxide solution (130 mole percent excess) to form a mixture having the following molar composition ratios $$K_2O/SiO_2=0.58, SiO_2/Al_2O_3=4 \text{ and } H_2O/K_2=316$$

This mixture was placed in a 20 ml. glass tube, sealed and heated at 120° C. for between 3 and 4 days. The product was discharged, filtered, washed and dried. Analysis of the product showed it to be a zeolite having the composition:

$$K_2O:Al_2O_3:2SiO_2:3H_2O$$

The product, zeolite Z, maintained its structure during dehydration at 300° C. As prepared the zeolite Z was in the form of small rods.

Zeolite Z may be identified by its X-ray diffraction pattern. The data from the X-ray diffraction pattern is set forth in Table A.

Table A

| Intensity | Interplanar Spacing $d$ (A.) obs. |
|---|---|
| Very very strong | 7.45 |
| very weak | 4.78 |
| medium | 3.98 |
| Do | 3.47 |
| Do | 3.29 |
| very strong | 3.09 |
| strong | 2.97 |
| very strong | 2.82 |
| medium weak | 2.35 |
| weak | 2.20 |
| medium | 2.11 |
| Do | 1.85 |
| Do | 1.74 |
| medium weak | 1.68 |
| medium | 1.59 |
| Do | 1.56 |

Figure 1:
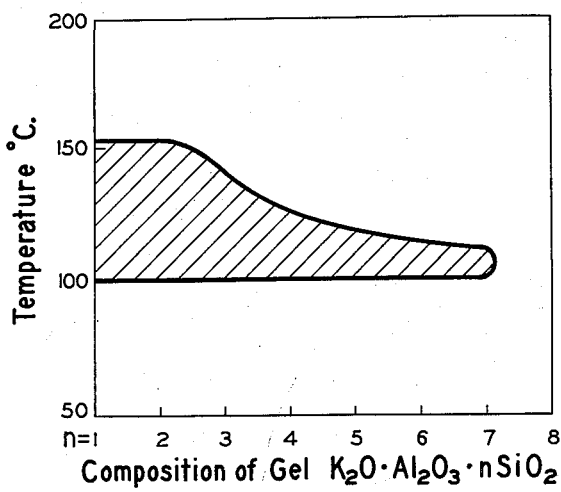
Fig. 1 is a graph showing the conditions under which zeolite Z may be prepared.

The shaded area in Fig. 1 indicates the ranges of gel compositions and temperatures which are satisfactory for making zeolite Z. In general a gel having a composition of $K_2O.Al_2O_3.nSiO_2$ where $n$ equals 1 to 7 can be held at 100° C. in the presence of potassium hydroxide to produce zeolite Z. As the concentration of $SiO_2$ in the gel is increased the permissible temperature decreases. With the gel forming solutions a temperature of about 100° C. is easily maintained but higher temperatures cut the reaction time required.

The potassium form of zeolite Z, obtained as described above, may be converted to other forms by exchanging the potassium ion for another cation. For example, when potassium zeolite Z is held in an aqueous solution of sodium nitrate or sodium chloride at about 110° C. sodium zeolite Z is formed. Using calcium nitrate or chloride results in the preparation of calcium zeolite Z. The X-ray diffraction pattern of these ion-exchanged forms of zeolite Z indicated that the crystal lattice was not appreciably altered by the substitution of the sodium or calcium for the potassium in the zeolite Z.

Figure 2:
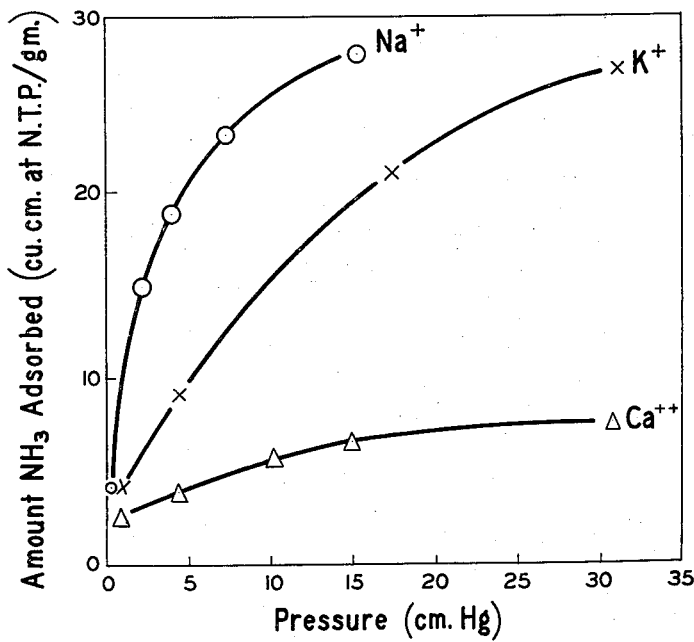
Fig. 2 is a graph showing the adsorption capacities of several forms of zeolite Z.

Samples of the potassium, sodium and calcium forms of zeolite Z were tested to determine their adsorption properties. In the tests several gases were brought into contact with zeolite Z under various conditions. Neither oxygen nor argon was adsorbed by any of the samples at −183° C. The adsorption was attempted after the samples had been dehydrated by heating them to about 350° C. Ammonia was adsorbed slowly at 20° C., and at 200° C. the sodium and potassium forms of the zeolite Z adsorbed ammonia fairly rapidly. In Fig. 2 the amounts of ammonia adsorbed per gram of sample at 200° C. and at various pressures have been plotted. From the curves in Fig. 2 it can be seen that the sodium form of zeolite Z has a greater capacity for ammonia under the test conditions than the other ion-exchanged forms.

Zeolite Z can be used to adsorb water and ammonia and other small polar molecules separating such molecules from mixtures with other materials.

What is claimed is:

1. A synthetic zeolitic molecular sieve having the composition $K_2O:Al_2O_3:2SiO_2:XH_2O$ wherein X may be any value up to 3, said molecular sieve having an X-ray diffraction pattern as shown in Table A.

2. A synthetic zeolitic molecular sieve having the composition $$\frac{M_2O}{n}:Al_2O_3:2SiO_2:XH_2O$$

wherein "M" represents an exchangeable cation selected from the group consisting of sodium, potassium and calcium ions, "n" the valence of "M," and "X" any value up to 3, said molecular sieve having an X-ray diffraction pattern as shown in Table A.

3. A process for making zeolite Z, which process comprises preparing a gel by mixing in aqueous solution reactants in proportions represented as particular ratios of oxides of potassium, aluminum and silicon; holding said gel at a particular temperature in the presence of up to about 130% molar excess of potassium hydroxide, the particular ratio of said materials in said gel and said particular temperature at which said gel is held being related so that both said ratio and said temperature fall within the shaded area of Figure 1 of the drawing; and continuing to hold said gel at said temperature until crystals of zeolite Z form, said crystals having the composition $$K_2O:Al_2O_3:2SiO_2:XH_2O$$

wherein X is a value up to 3 and having an X-ray diffraction pattern as shown in Table A.

4. A process for producing zeolite Z which comprises (1) preparing a potassium aluminosilicate gel whose composition, expressed in terms of oxide mol ratios, is about as follows:

$$K_2O:Al_2O_3:nSiO_2$$

wherein n is a value from about 1 to about 4, and (2) maintaining said gel at a temperature within the shaded area of Figure 1 corresponding to a value of n from about 1 to about 4 in the presence of up to about 130% molar excess of potassium hydroxide until crystals are formed which have the composition:

$$K_2O:Al_2O_3:2SiO_2:XH_2O$$

wherein X is any value up to 3 and which have an X-ray diffraction pattern as shown in Table A.

References Cited in the file of this patent

UNITED STATES PATENTS

| | | |
|---|---|---|
| 1,472,011 | Lee | Oct. 23, 1923 |
| 1,907,821 | Jaeger | May 9, 1933 |
| 2,413,134 | Barrer | Dec. 24, 1946 |
| 2,512,053 | Calmon | June 20, 1950 |
| 2,882,243 | Milton | Apr. 14, 1959 |

FOREIGN PATENTS

| | | |
|---|---|---|
| 17,663 | Great Britain | 1914 |

OTHER REFERENCES

Barrer et al.: "J. of the Chem. Soc.," pp. 1561–1571, May 1952.

Mellor: Comprehensive Treatise on Inorganic and Theoretical Chemistry, vol. 6, p. 649, Longmans, Green and Co., N.Y., 1925.

"Selective Adsorption with Zeolites," vol. 32, Chemical Engineering News, page 4786, November 29, 1954.

UNITED STATES PATENT OFFICE
CERTIFICATION OF CORRECTION

Patent No. 2,972,516            February 21, 1961

Richard Maling Barrer et al.

It is hereby certified that error appears in the above numbered patent requiring correction and that the said Letters Patent should read as corrected below.

Column 1, lines 59 and 60, for that portion of the formula reading "$\frac{M_2O}{n}$" read -- $\frac{M_2O}{n}$ --; column 2, line 4, for that portion of the formula reading "$H_2O/K_2$" read -- $H_2O/K_2O$ --; column 3, lines 15 and 16, for that portion of the formula reading "$\frac{M_2O}{n}$" read -- $\frac{M_2O}{n}$ --.

Signed and sealed this 15th day of August 1961.

(SEAL)
Attest:

ERNEST W. SWIDER
Attesting Officer

DAVID L. LADD
Commissioner of Patents